No. 795,792. PATENTED JULY 25, 1905.
J. G. FASSETT.
PRESS FOLLOWER FOR DRIED FRUITS, &c.
APPLICATION FILED FEB. 10, 1904.
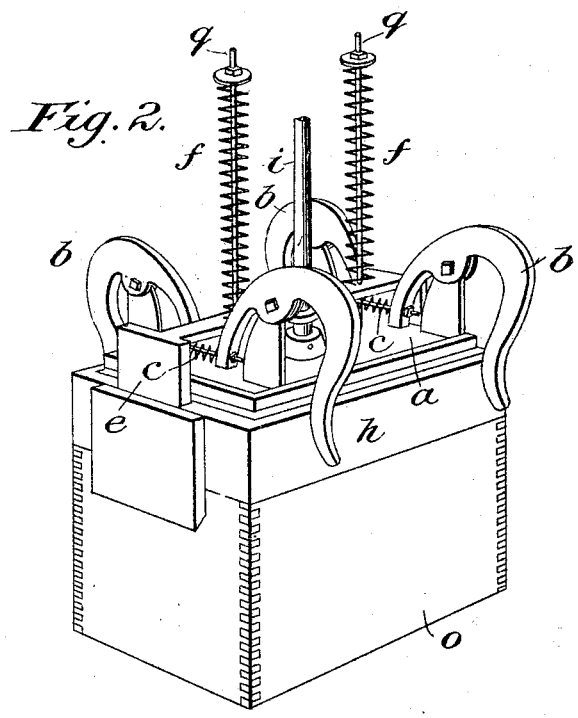
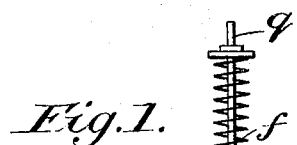
Witnesses:
M. B. Fassett
W. A. Banks
Inventor:
John G. Fassett

UNITED STATES PATENT OFFICE.

JOHN G. FASSETT, OF PASADENA, CALIFORNIA.

PRESS-FOLLOWER FOR DRIED FRUITS, &c.

No. 795,792. Specification of Letters Patent. Patented July 25, 1905.

Application filed February 10, 1904. Serial No. 193,216.

*To all whom it may concern:*

Be it known that I, JOHN G. FASSETT, a citizen of the United States, residing at Pasadena, in the county of Los Angeles and State of California, have invented a new and useful Press-Follower for Dried Fruits and other Articles, of which the following is a specification.

My invention relates to improvements in press-followers for dried fruits and other articles in which the follower presses the articles into the box; and the objects of my improvement are, first, to provide adjustable arms, attached to the follower, which shall reach around the filling-frame and hold the sides of the box from bursting out as the follower descends into the box; second, to make the arms of such shape that they shall assist in guiding the follower into the box, and, third, to provide a means of compelling the filling-frame to remain on the box as the follower is being removed. I attain these objects by the mechanism illustrated in the accompanying drawings, in which—

Figure 1 is an end view; and Fig. 2 a view in perspective, showing the follower $a$ ready to descend into the box O through the filling-frame $h$.

Similar letters refer to similar parts throughout both views.

The plate $a$ is the part which, descending into the box O, comes in actual contact with the articles to be pressed. To the plate $a$ are attached the arms $b\,b\,b\,b$, which, reaching around the filling-frame $h$, hold the sides of the box O from bursting out as the plate $a$ descends into the box O. The arms $b\,b\,b\,b$ are given an outward turn at their extremities, so that they act as guides to the machine as it enters the filling-frame $h$. Each arm is bolted to a projection on the plate $a$ in such manner that the ends of the arms may have a certain amount of free motion.

Each pair of arms $b\,b$ is held in place, first, from having the ends come closer together than they should by a spring or hard-rubber cushion $c$, and, second, from spreading apart by a bolt and nut $d$, this combination of spring, bolt, and nut facilitating the easy adjustment of the arms $b\,b$.

The bar $e$ extends horizontally across the top of the plate $a$ and in the direction which is most convenient, according to the shape of the filling-frame $h$. This bar is held in place from moving horizontally by long bolts $q\,q$ passing through the bar $e$ and into the plate $a$; but the bar $e$ is allowed to move vertically along the bolts $q\,q$. Around the bolts and resting upon the bar $e$ are placed springs $f\,f$, which tend to keep the bar $e$ as close as possible to the plate $a$. The object of the above-described bar $e$, bolts $q\,q$, and springs $f\,f$ is that as the plate $a$ descends into the filling-frame $h$ and box O the ends of the bar $e$ rest upon the filling-frame $h$ and is held firmly to the filling-frame $h$ by means of the springs $f\,f$, and as the plate $a$ is removed from the box O the bar $e$ remains in contact with the filling-frame $h$ until the plate $a$ as it leaves the box O and filling-frame $h$ comes in contact with the bar $e$, removing the bar $e$ along with the remainder of the mechanism, leaving the filling-frame $h$ free, but still in contact with the box O.

The press-follower may be connected to the power which is to move it by means of the rod $i$.

What I claim as my invention, and desire to secure by Letters Patent, is—

1. The combination in a press-follower of horizontally-adjustable arms, $b$, secured to the upper side of the follower, and the arms, $b$, having such shape that they reach around the filling-frame, $h$, and travel along the outside of the box, O, at the same time the follower travels along the inside of the same box, O, each pair of arms, $b$, being connected by a bolt, $d$, and each bolt, $d$, carrying a spring, $c$, in such manner that the spring, $c$, exerts an outward pressure on the arms, $b$, all substantially as described and for the purpose specified.

2. The combination in a press-follower having adjustable arms, of upwardly-extending bolts, $q$, secured to the follower, and a horizontal bar, $e$, arranged to slide vertically along said bolts, $q$, and springs, $f$, secured to said bolts, $q$, in such manner as to exert a downward pressure on bar, $e$, substantially as shown and for the purpose specified.

In testimony whereof I have signed my name to this specification in the presence of two subscribing witnesses.

JOHN G. FASSETT.

Witnesses:
    M. B. FASSETT,
    E. J. WILLIAMS.